(12) United States Patent
Motill et al.

(10) Patent No.: US 10,567,709 B1
(45) Date of Patent: Feb. 18, 2020

(54) BLOWER EXTENSION WITH VIDEO FEED

(71) Applicants: Kenneth Motill, Meridian, MS (US);
Donna Motill, Meridian, MS (US)

(72) Inventors: Kenneth Motill, Meridian, MS (US);
Donna Motill, Meridian, MS (US)

( * ) Notice: Subject to any disclaimer, the term of this patent is extended or adjusted under 35 U.S.C. 154(b) by 0 days.

(21) Appl. No.: 15/719,325

(22) Filed: Sep. 28, 2017

(51) Int. Cl.
| | |
|---|---|
| *H04N 7/18* | (2006.01) |
| *E04D 13/076* | (2006.01) |
| *B60S 3/04* | (2006.01) |
| *E04D 15/00* | (2006.01) |
| *B08B 5/02* | (2006.01) |
| *H04N 5/225* | (2006.01) |
| *E01H 1/08* | (2006.01) |
| *F16L 27/12* | (2006.01) |

(52) U.S. Cl.
CPC ............... *H04N 7/185* (2013.01); *B08B 5/02* (2013.01); *B60S 3/044* (2013.01); *E01H 1/0809* (2013.01); *E04D 13/0765* (2013.01); *E04D 15/006* (2013.01); *H04N 5/2252* (2013.01); *E01H 2001/0881* (2013.01); *F16L 27/12* (2013.01)

(58) Field of Classification Search
CPC ...... H04N 7/185; H04N 5/2252; B60S 3/044; E04D 15/006; E04D 13/0765; E01H 1/0809; E01H 2001/0881; B08B 5/02; F16L 27/12
USPC .......................................................... 15/405
See application file for complete search history.

(56) References Cited

U.S. PATENT DOCUMENTS

| | | | |
|---|---|---|---|
| 3,041,655 A * | 7/1962 | Entler ................. | E04D 13/0765 134/167 R |
| 5,195,209 A | 3/1993 | Watkins | |
| 7,802,338 B1 | 9/2010 | Hall | |
| 8,739,362 B1 * | 6/2014 | Conder ............... | E04D 13/0765 15/406 |
| 9,725,908 B2 * | 8/2017 | Ashton-Miller .... | E04D 13/0765 |
| 2004/0143931 A1 * | 7/2004 | Dennis ...................... | A47L 5/14 15/414 |

FOREIGN PATENT DOCUMENTS

AU        2011100760        * 8/2011

* cited by examiner

Primary Examiner — David Redding

(57) ABSTRACT

A blower extension with video feed having a flexible tube that is selectively engageable with a standard blower. A vertical adjustable tube is attached to the flexible tube. The vertical adjustable tube has an upper section slidadbly disposed within a lower section such that the upper section has a compacted position, a plurality of alternate extended positions, and an alternate maximum reach position. A collar disposed on the lower section is configured to tighten and loosen to fix the upper section. A 90° elbow is disposed on the upper section. A horizontal fixed tube is disposed on the elbow, and an angled nozzle with a bend and a reducer is disposed on a terminal end of the horizontal fixed tube. A camera is disposed within a camera housing attached to the upper section, and a monitor in operational communication with the camera is disposed on the lower section.

4 Claims, 5 Drawing Sheets

US 10,567,709 B1

BLOWER EXTENSION WITH VIDEO FEED

BACKGROUND OF THE INVENTION

Various types of blowers are known in the prior art. Most existing blowers for rooftops and other hard to reach places are standalone devices and cannot be used with existing blowers. Furthermore, existing blowers often don't provide the correct combination of flexible and rigid tubing, or the correct bends to move from vertical to horizontal and finally to a nozzle. What is needed, and what the present blower extension with video feed provides, is a device that can be used with existing blowers that provides a flexible tube to attach to the blower, an extendable vertical tube, a 90° elbow attached to a horizontal tube, and finally a nozzle with a bend and a reducer to optimize air flow and direction onto the desired area. What is also needed is a camera and monitor system to allow the user to see which areas need blowing and which have effectively been blown.

FIELD OF THE INVENTION

The present invention relates to leaf blowers, and more particularly, to a blower extension with video feed.

SUMMARY OF THE INVENTION

The general purpose of the present blower extension with video feed, described subsequently in greater detail, is to provide a blower extension with video feed that has many novel features that result in a blower extension with video feed that is not anticipated, rendered obvious, suggested, or even implied by prior art, either alone or in combination thereof.

To accomplish this, the present blower extension with video feed includes a flexible tube having a blower end, an extender end, and a first inner diameter, wherein the blower end is selectively engageable with a standard blower. A size adapter may be included to engage with different blowers. A vertical adjustable tube is disposed on the extender end of the flexible tube. The vertical adjustable tube has a length, a lower section, an upper section, a collar, and a second inner diameter. The second inner diameter substantially conforms to the first inner diameter of the flexible tube. The collar is disposed on a top end of the lower section, and the upper section is slidadbly disposed within the lower section such that the upper section has a compacted position, a plurality of alternate extended positions, and an alternate maximum reach position. The collar is configured to tighten and loosen to fix the upper section in one of said positions. An elbow having an angle and a third inner diameter is disposed on a distal end of the upper section. The angle of the elbow is ideally 90°. The third inner diameter substantially conforms to the first inner diameter. A horizontal fixed tube is disposed on the elbow, wherein the horizontal fixed tube has a fourth inner diameter substantially conforming to the first inner diameter. An angled nozzle is disposed on a terminal end of the horizontal fixed tube. The angled nozzle has a bend and a reducer, wherein the reducer has a fifth inner diameter and a sixth inner diameter. The fifth inner diameter substantially conforms to the first inner diameter and the sixth inner diameter is less than the fifth inner diameter, allowing the reducer to increase the pressure of airflow that passes through. The bend of the angled nozzle is between 10° and 20°, and is ideally 15°. A camera is disposed within a camera housing attached to the upper section of the vertical adjustable tube proximal the distal end thereof. A monitor is disposed on the lower section of the vertical adjustable tube, and the monitor is in operational communication with the camera to allow a user to view what areas need to be blown.

Thus have been broadly outlined the more important features of the present blower extension with video feed so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
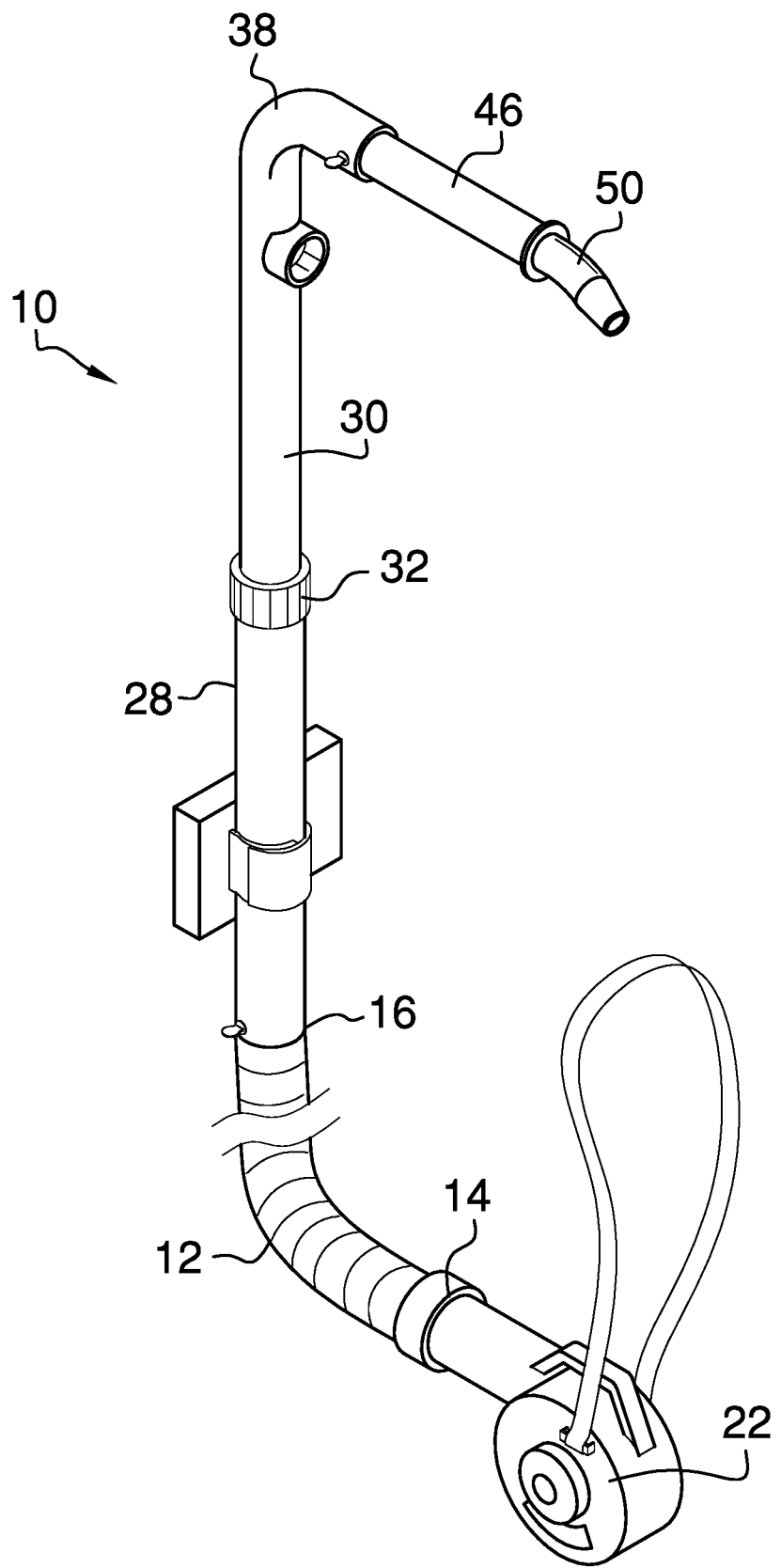
FIG. 1 is an isometric view of a blower extension with video feed.
Figure 2:
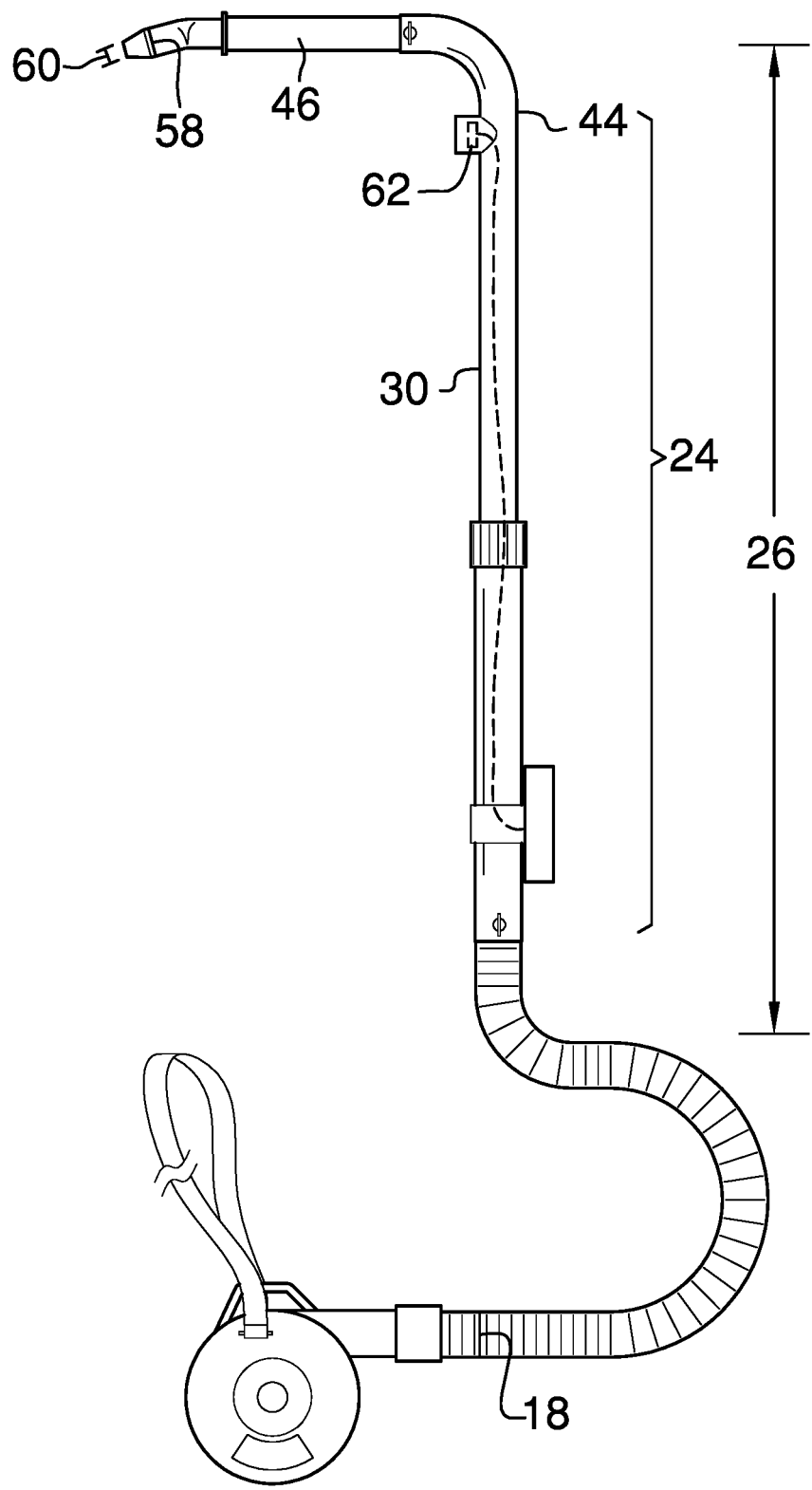
FIG. 2 is a side elevation view of the blower extension with video feed.
Figure 3:
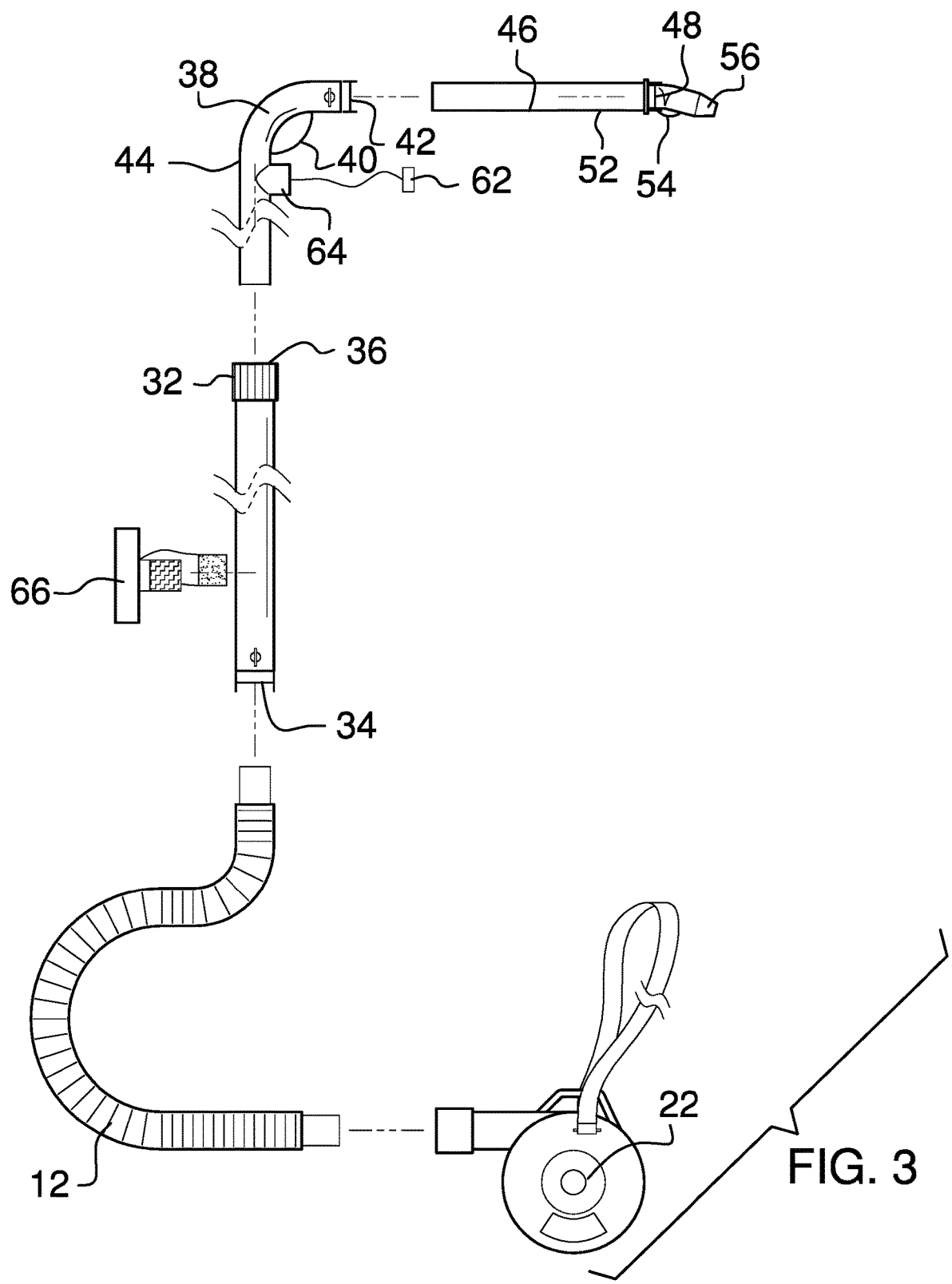
FIG. 3 is an exploded side elevation view of the blower extension with video feed.
Figure 4:
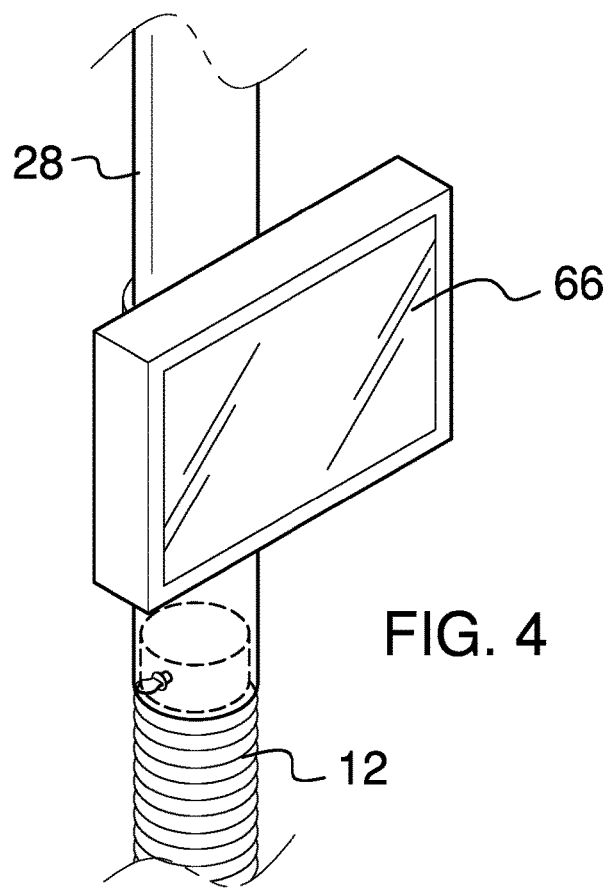
FIG. 4 is an isometric detail view of the blower extension with video feed.
Figure 5:
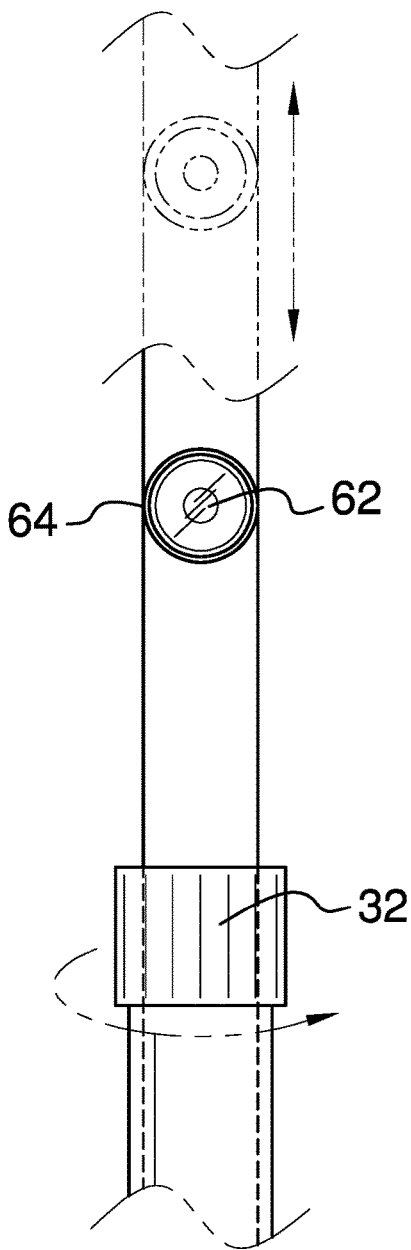
FIG. 5 is a front elevation detail view of the blower extension with video feed.
Figure 6:
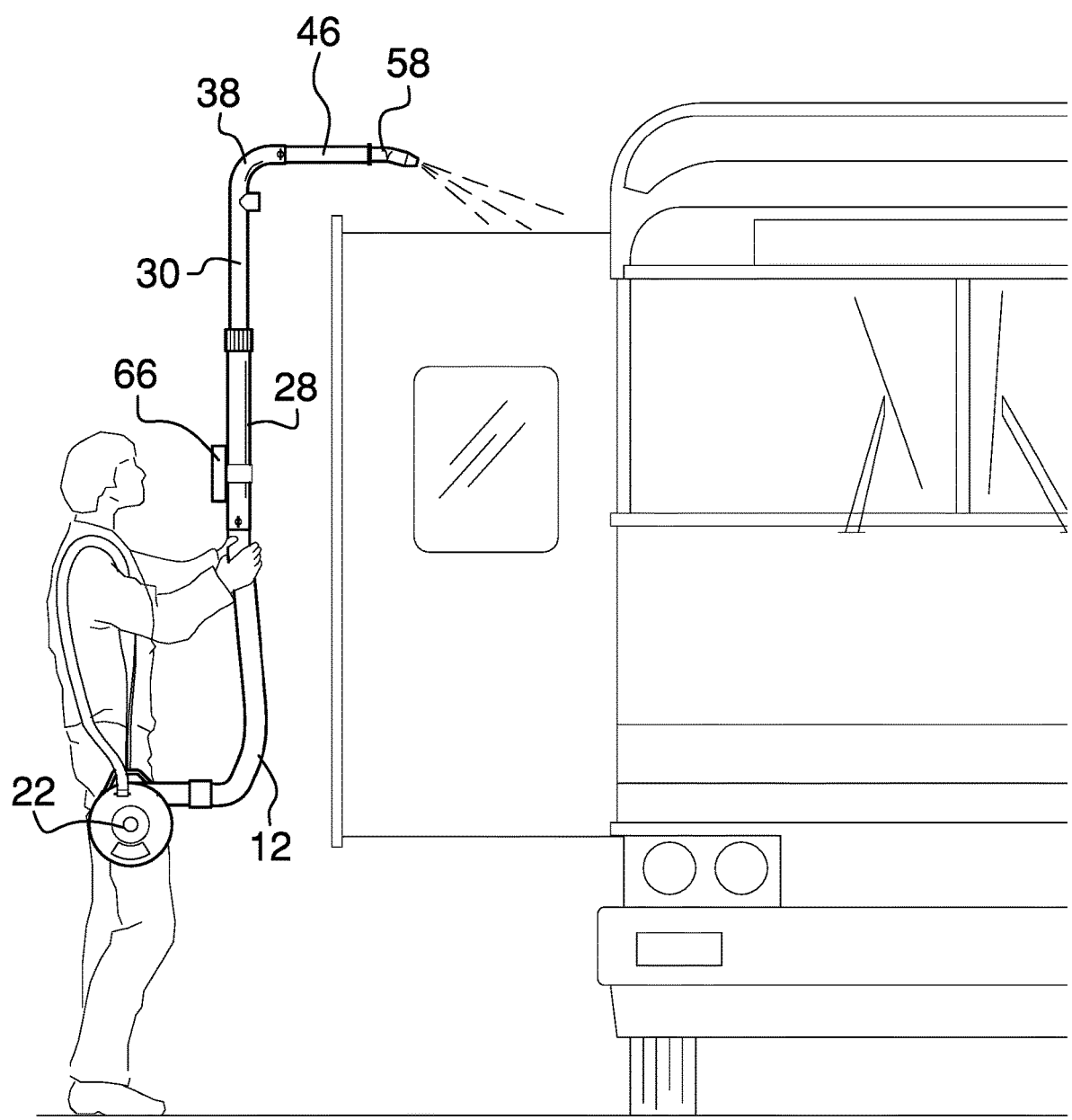
FIG. 6 is an in-use side elevation view of the blower extension with video feed.

With reference now to the drawings, and in particular FIGS. 1 through 6 thereof, an example of the instant blower extension with video feed employing the principles and concepts of the present blower extension with video feed and generally designated by the reference number 10 will be described.

Referring to FIGS. 1 through 6 the present blower extension with video feed 10 is illustrated. The blower extension with video feed 10 includes a flexible tube 12 having a blower end 14, an extender end 16, and a first inner diameter 18, wherein the blower end 14 is selectively engageable with a standard blower 22. A vertical adjustable tube 24 is disposed on the extender end 16 of the flexible tube. The vertical adjustable tube has a length 26, a lower section 28, an upper section 30, a collar 32, and a second inner diameter 34. The second inner diameter 34 substantially conforms to the first inner diameter 18 of the flexible tube. The collar 32 is disposed on a top end 36 of the lower section, and the upper section 30 is slidadbly disposed within the lower section 28 such that the upper section has a compacted position, a plurality of alternate extended positions, and an alternate maximum reach position. An elbow 38 having an angle 40 and a third inner diameter 42 is disposed on a distal end 44 of the upper section 30. The angle 40 of the elbow is ideally 90°. The third inner diameter 42 substantially conforms to the first inner diameter 18. A horizontal fixed tube 46 is disposed on the elbow 38, wherein the horizontal fixed tube has a fourth inner diameter 48 substantially conforming to the first inner diameter 18. An angled nozzle 50 is disposed on a terminal end 52 of the horizontal fixed tube 46. The angled nozzle has a bend 54 and a reducer 56, wherein the reducer has a fifth inner diameter 58 and a sixth inner diameter 60. The fifth inner diameter 58 substantially conforms to the first inner diameter 18 and the sixth inner diameter 60 is less than the fifth inner diameter 58. A camera 62 is disposed within a camera housing 64 attached to the upper section 30 of the vertical adjustable tube proximal the distal end 44 thereof. A monitor 66 is disposed on the lower section 28 of the vertical adjustable tube, and the monitor is in operational communication with the camera 62.

What is claimed is:

1. A blower extension with video feed comprising:
   a flexible tube having a blower end, an extender end, and a first inner diameter, wherein the blower end is selectively engageable with a standard blower;
   a vertical adjustable tube disposed on the extender end of the flexible tube having a length, a lower section, an upper section, a collar, and a second inner diameter, wherein the collar is disposed on a top end of the lower section, wherein the upper section is slidadbly disposed within the lower section, wherein the second inner diameter substantially conforms to the first inner diameter of the flexible tube, wherein the upper section has a compacted position, a plurality of alternate extended positions, and an alternate maximum reach position, wherein the collar is configured to tighten and loosen to fix the upper section in one of said positions;
   an elbow having an angle and a third inner diameter, wherein the elbow is disposed on a distal end of the upper section, wherein the third inner diameter substantially conforms to the first inner diameter;
   a horizontal fixed tube disposed on the elbow, wherein the horizontal fixed tube has a fourth inner diameter substantially conforming to the first inner diameter;
   an angled nozzle having a bend and a reducer, wherein the angled nozzle is disposed on a terminal end of the horizontal fixed tube, wherein the reducer has a fifth inner diameter and a sixth inner diameter, wherein the fifth inner diameter substantially conforms to the first inner diameter and the sixth inner diameter is less than the fifth inner diameter, wherein the reducer is configured to increase pressure of airflow there through;
   a camera housing disposed on the upper section of the vertical adjustable tube proximal the distal end thereof, said camera housing extending perpendicularly from the vertical adjustable tube towards the nozzle;
   a camera disposed within the camera housing; and
   a monitor disposed on the lower section of the vertical adjustable tube, wherein the monitor is in operational communication with the camera.

2. The blower extension with video feed of claim 1 wherein the angle of the elbow is 90°.

3. The blower extension with video feed of claim 1 wherein the bend is between 10° and 20°.

4. The blower extension with video feed of claim 1 wherein the length of the vertical adjustable tube is greater than 3.5 meters when the upper section is in the maximum reach position.

* * * * *